United States Patent [19]
Barton et al.

[11] Patent Number: 4,778,550
[45] Date of Patent: Oct. 18, 1988

[54] METHOD FOR DEVELOPING A POINT OF ONE END OF AN EXTRUDED PLASTIC VEHICLE MOLDING

[75] Inventors: Billy J. Barton, Royal Oak; Russell A. Simms, Pontiac, both of Mich.

[73] Assignee: Chrysler Motors Corporation, Highland Park, Mich.

[21] Appl. No.: 118,813

[22] Filed: Nov. 9, 1987

[51] Int. Cl.⁴ ............................................. B32B 31/18
[52] U.S. Cl. ..................... 156/211; 156/245; 156/254; 156/258; 156/268; 264/328.1; 428/31
[58] Field of Search .............. 156/211, 254, 258, 268, 156/242, 245; 428/31; 264/328.1

[56] References Cited

U.S. PATENT DOCUMENTS

| | | | |
|---|---|---|---|
| 3,959,538 | 5/1976 | Loew | 428/31 |
| 3,969,172 | 7/1976 | Hotton | 156/211 |
| 3,970,498 | 7/1976 | Loew | 156/211 |
| 4,174,986 | 11/1979 | Jennings | 156/211 |
| 4,617,209 | 10/1986 | Ives | 428/31 |
| 4,619,847 | 10/1986 | Jackson | 428/31 |

FOREIGN PATENT DOCUMENTS 2047213  3/1972  Fed. Rep. of Germany ...... 156/211

*Primary Examiner*—Caleb Weston
*Attorney, Agent, or Firm*—Edward A. Craig

[57] ABSTRACT

The invention provides a method for developing a point on one end of a vehicle molding which is initially fabricated as an extruded member of a resinous material of a first color with a uniform transverse cross-section. A longitudinal extending layer of a second color is adhered to a portion of the exterior surface leaving a second longitudinal portion of the exterior surface of the first color. The pointed end is provided by first cutting a wedge shaped section out of one end of the molding, pressing the ends of the molding together in an injection mold and then reforming the end of the molding in the desired pointed configuration by the injection of liquid resinous material into the mold.

4 Claims, 2 Drawing Sheets

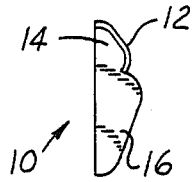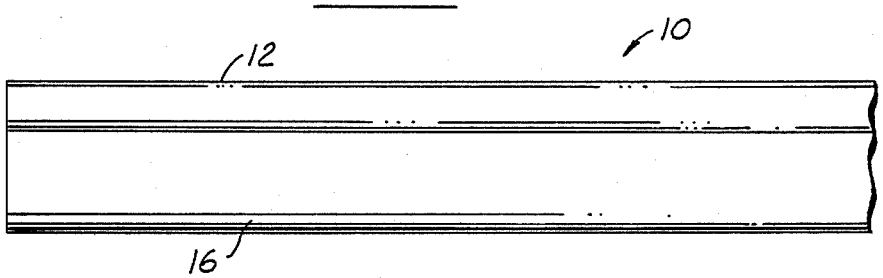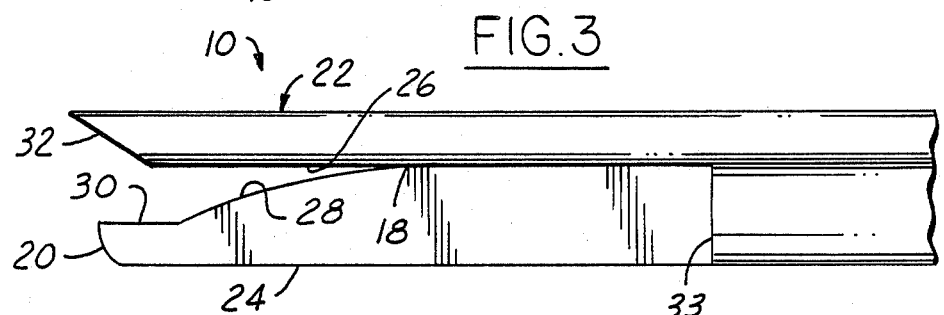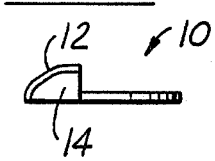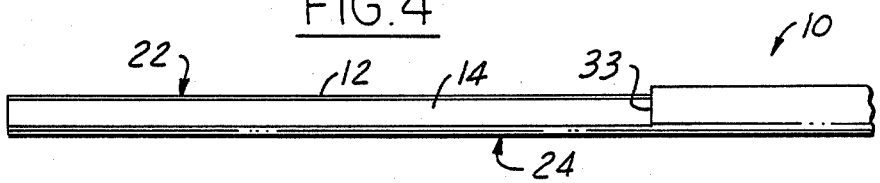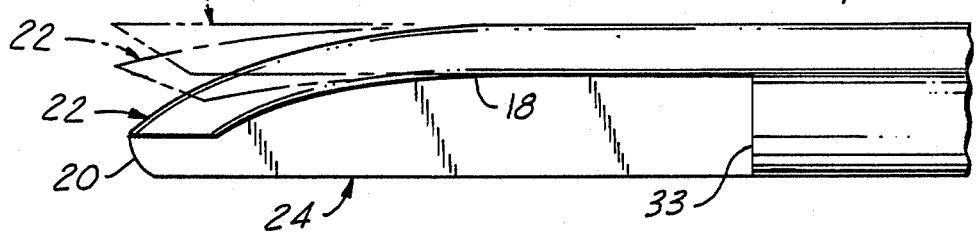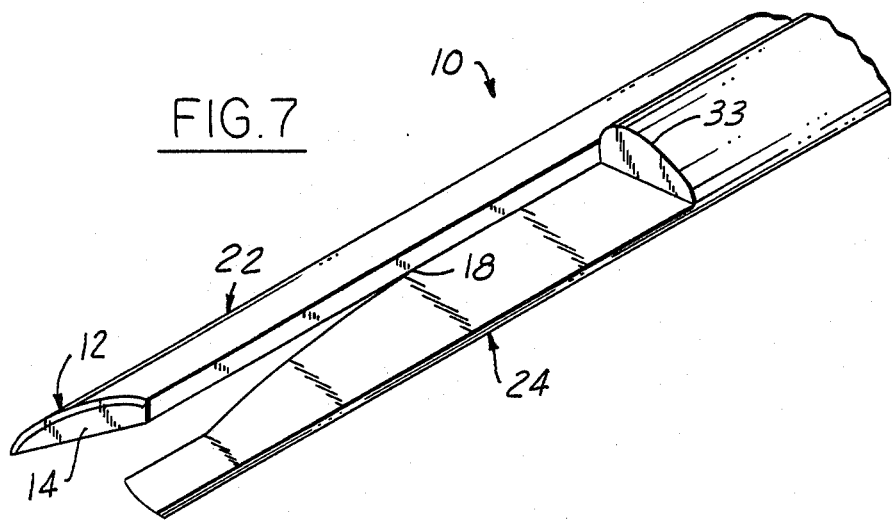

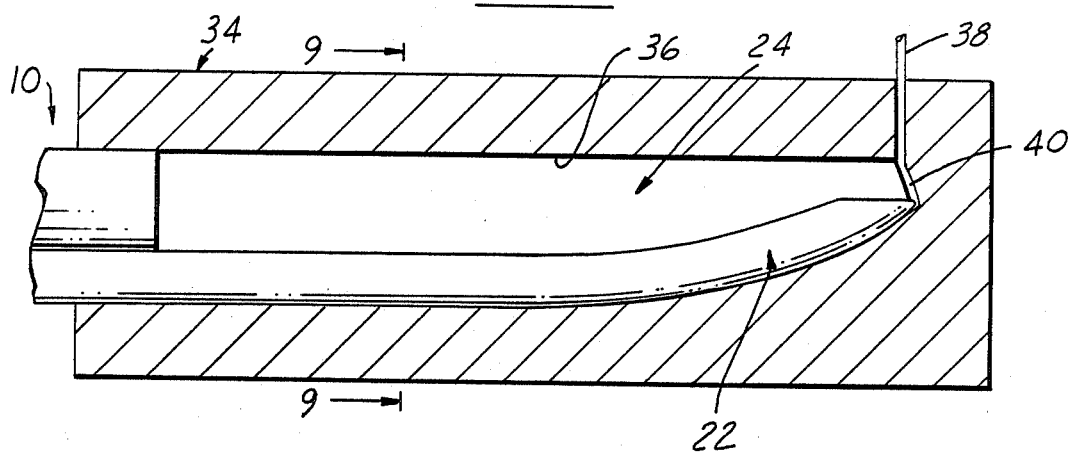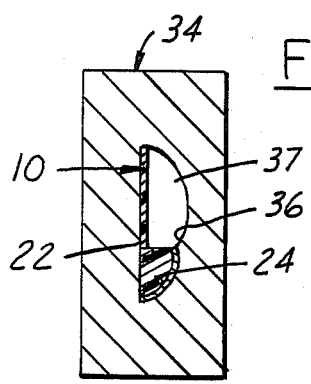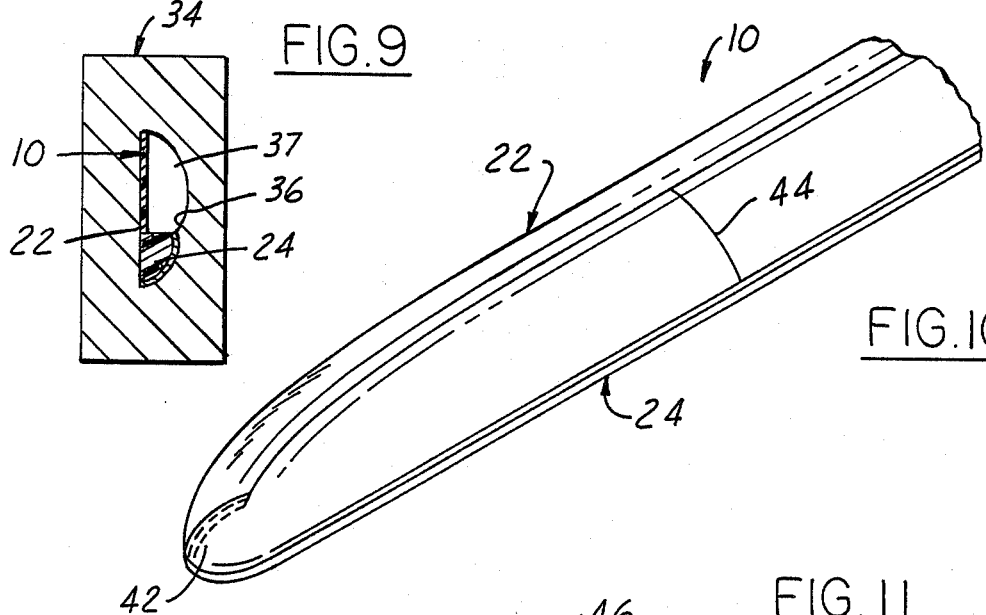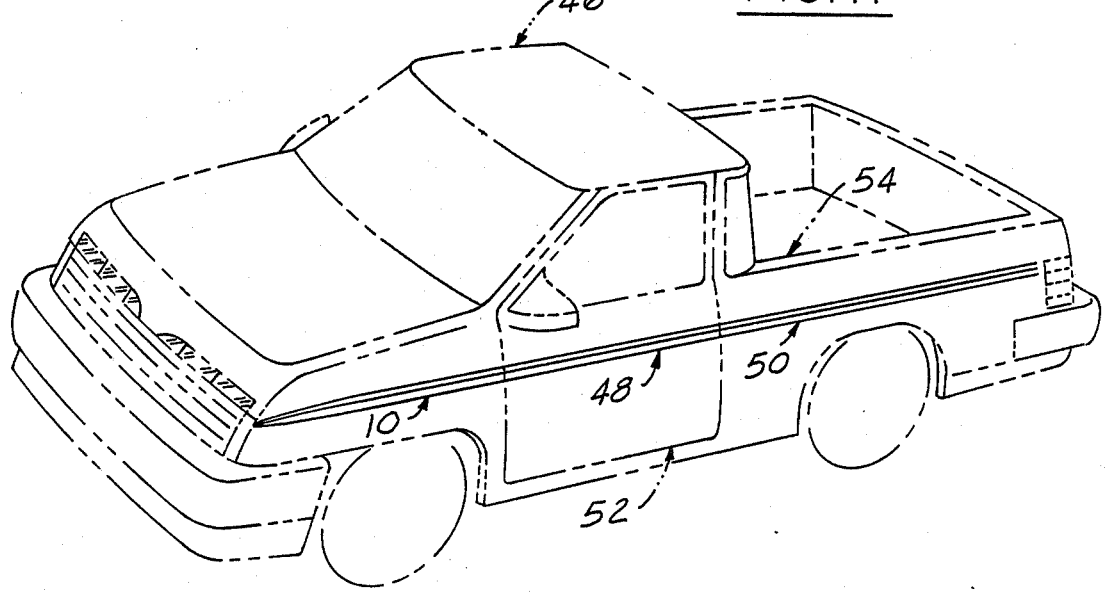

METHOD FOR DEVELOPING A POINT OF ONE END OF AN EXTRUDED PLASTIC VEHICLE MOLDING

BACKGROUND OF THE INVENTION

1. Field of the Invention

A method is provided for developing a point on one end of an extruded plastic vehicle molding, the molding having two longitudinally extending portions of different colors.

2. Prior Art

Molding strips which are frequently both decorative and protective are used on exterior surfaces of vehicles. Designers often want the strips to terminate in pointed ends for aesthetic purposes. The moldings are normally fabricated as extruded plastic elements having a uniform transverse cross-section. This results in molding strips which have what might be referred to as square ends. If material is merely cut from an end to result in a point, the molding has an unfinished appearance which is objectionable from a design point of view.

One technique that has been used in the past to provide pointed ends on moldings has been to remove a V-shaped notch or wedge from the end of the molding with subsequent pressing of the remaining end pieces together and heat sealing them to each other. This has resulted in at least providing exterior surface portions of the pointed ends which have the finished appearance desired. Examples of this technique are disclosed in U.S. Pat. Nos. 3,959,538, Loew; 3,961,972, Hotton; 3,970,498, Loew; and 4,174,986, Jennings. Another technique for providing a pointed end on such moldings has been to injection mold an end cap and attach it to the end of the molding by heat sealing. This technique is shown, in for example, U.S. Pat. No. 4,617,209, Ives.

In accordance with the present invention, a wedge shaped section is removed from the end of the molding in a manner similar to that which has been proposed in the past. However, rather than heat sealing the end pieces together, additional material is removed from the end and the entire end of the molding is placed in an injection mold with the end being filled with new material. This results in a superior finished appearance and also provides better bonding of the end pieces so that they will not separate in use of the molding.

SUMMARY OF THE INVENTION

A method is provided for developing a point on one end of a vehicle molding. The molding is initially extruded of a flexible resinous material of a first color with a uniform transverse cross-section. A longitudinally extending layer of a second color is adhered to a first portion of the exterior surface thereof leaving a second longitudinal portion of the exterior surface of the molding with said first color.

In the method, a generally wedge-shaped section is removed from one end of the molding entirely from material of the second portion of the molding and entirely through the thickness of the molding with the apex thereof spaced longitudinally inwardly from the end surface of the molding to define first and second spaced apart legs. The first leg is formed of material of the first portion and the second leg is formed of material of the second portion. A portion of the outer end of each leg is removed to form a configuration resulting in mating of the outer ends of the legs upon bending of the first leg into contact with the second leg to form a pointed end on the molding. Additionally, a longitudinal section of the exterior thickness of the second portion is removed to a point beyond the apex of the wedge-shaped section.

A mold having a cavity confirming to the shape of the desired pointed end is provided. The end of the molding is inserted into the mold cavity wherein the first leg is bent into contact with the second leg. Liquid resinous material of the first color is then injected into the mold cavity in an amount sufficient to fill the mold cavity and reform the longitudinal section of the second portion which was removed. The injected resinous material is then allowed to harden and bond to the molding to form the final desired pointed end of the molding.

Preferably, the inner surface at the outer end of the second leg is formed as a longitudinally extending flat surface and the inner surface at the outer end of the first leg is formed as a flat surface at an angle directed at the second leg. The wedge-shaped section desirably defines a straight surface extending from the apex along the first portion and a curved surface extending from the apex into the material of the second portion. In the molding process, the mold is preferably provided with a void which remains at the pointed end of the cavity after insertion of the molding so that liquid resin injected into the mold cavity will cover the end of the molding.

IN THE DRAWINGS

FIG. 1 is an elevational view of a portion of a molding prior to developing a point on one end in accordance with one embodiment of the present invention;

FIG. 2 is an end view of the molding of FIG. 1;

FIG. 3 is an elevational view of the molding after a wedge-shaped section has been removed therefrom, the ends have been configured, and a longitudinal section of the exterior thickness has been removed.

FIG. 4 is a side view of the molding in the FIG. 3 condition;

FIG. 5 is an end view of the molding in the FIG. 3 condition;

FIG. 6 is a view similar to FIG. 3 illustrating bending of the end pieces of the molding together to provide the desired pointed end;

FIG. 7 is a view in perspective of the molding in the FIG. 3 condition;

FIG. 8 is a sectional view of a mold having a cavity into which the end of the molding has been inserted;

FIG. 9 is a sectional view of the mold taken substantially along the line 9—9 of FIG. 8 looking in the direction of the arrows;

FIG. 10 is a view in perspective of the finished pointed end of the molding; and FIG. 11 illustrates mounting of the molding as a body side molding of a pickup truck.

DETAILED DESCRIPTION OF A PREFERRED EMBODIMENT

Referring to FIGS. 1 and 2, it will be noted a molding 10 is provided as an elongated strip which is desirably fabricated as by extrusion. The molding 10 is fabricated of a flexible resinous material, as for example, PVC. The resinous material is of a first color, as for example, black. The molding 10 has a uniform transverse cross-section as may be seen in FIG. 2. A longitudinally extending layer 12 of a second color is adhered to a first portion 14 of the exterior surface of the molding 10, leaving a second longitudinal portion 16 of the exterior surface of the molding with the first color, thus presenting a bi-colored appearance. The layer 12 may be, for example, a bright layer of metalized plastic tape which is adhered to the first portion 14 of the molding 10. Alternately, coloring material may be directly deposited on the portion 14. As will be noted in FIG. 2, the portions 14, 16 have curved exterior surfaces to give a desired aesthetic effect.

A wedge-shaped section is cut from the end of the molding 10 entirely from the material of the second portion 16 and entirely through the thickness of the molding 10 with the apex 18 spaced longitudinally inwardly from the end surface 20 of the molding to thereby define first and second spaced apart legs 22, 24. The wedge-shaped section defines a straight surface 26 extending from the apex 18 along the edge of the first portion and a curved surface 28 extending from the apex 18 into the material of the second portion.

The ends of the legs 22, 24 are configured so that they will mate upon bending of the leg 22 into contact with the leg 24 as illustrated in FIG. 6. The configuration of the ends of the legs consist of forming a longitudinally extending flat surface 30 on the inner surface of the outer end of the leg 24 and forming a flat surface 32 at an angle directed at the leg 24 on the inner surface at the outer end of the leg 22. A small portion of the extreme outer end of the leg 24 is cut away so that when the legs are bent into each other, the end of the leg 22 will extend slightly beyond the end of the leg 24 as will be noted in FIG. 6. This facilitates the provision of material on the very end of the molding as will be later described.

A longitudinal section of the exterior thickness on the second portion 16 is also removed from a point 33 beyond the apex 18 to the outer end of the second portion 16 to thereby form a relatively thin flap-like leg 24 as shown in FIGS. 4, 5 and 7. The function of this flap-like portion is to provide structure for later bonding of injected resinous material to the molding. The relatively large surface area of the thus constituted leg 24 results in superior bonding not only to the leg 24 but also to the inner surface of the other leg 22. The various portions of the molding 10 which are removed may be removed by conventional means such as die cutting.

The legs 22, 24 of the molding 10 are then bonded together and the cutaway section of the second portion 16 is reformed by means of injection molding. A representative injection mold 34 is shown in FIG. 8. The mold has a cavity 36 which conforms to the shape of the desired pointed end of the molding 10. Liquid resinous material of the first color is injected into the mold 34 via inlet 38 to fill the cavity void 37 and reform the longitudinal section of the second portion 16 which had previously been removed. The resinous material is, of course, at elevated temperature and will therefore form the desired flowable liquid which will adhere to the exposed surface portions of the molding and cause bonding of the various contacting surfaces.

A void 40 remains at the inner end of the cavity 36 after insertion of the molding 10 so that liquid resin which is injected will fill the void 40 and cover the end of the molding. The final molding as will be noted in FIG. 9, has an end cap 42 which covers the outer end of the molding 10. The slight difference in the length of the legs 22, 24 referred to with reference to FIG. 6 provides a surface configuration which tends to retain the cap 42 in place. Use of a cap 42 is not only visually attractive but also protects the end of the molding and prevents separation of the legs 22, 24. For example, these legs could be pulled away from each other as by the twirling brushes used in car washes.

The injected liquid resinous material may be the same material from which the molding 10 is originally fabricated as, for example PVC, and is the same color as the secod portion 16. Thus, the final appearance of the molding 10 presents a continuous uninterrupted exterior surface appearance. As will be seen in FIG. 10, a line 44 may be slightly visible but this is the only point in which a discontinuous appearance may be detected.

FIG. 11 illustrates mounting of a molding 10 onto the side of a pickup truck 46 to form a body side molding. As will be noted, the pointed end of the molding 10 terminates just short of the front grille of the pickup truck with other pieces 48, 50 of molding being mounted on the door 52 and cargo portion 54. The overall appearance gives the general impression of a "spear", which is desired from a design standpoint.

We claim:

1. A method for developing a point on one end of a vehicle molding, the molding being initially extruded of a flexible resinous material of a first color with a uniform transverse cross-section and having a longitudinally extending layer of a second color adhered to a first portion of the exterior surface thereof leaving a second longitudinal portion of the exterior surface of the molding of said first color, comprising the steps of:
   a. removing a generally wedge-shaped section from said one end of the molding entirely from the material of the second portion of the molding and entirely through the thickness of the molding with the apex thereof spaced longitudinally inwardly from the end surface of the molding to thereby define first and second spaced apart legs, the first leg being formed of material of the first portion and the second leg being formed of material of the second portion,
   b. removing a portion of the outer end of each leg to form a configuration resulting in mating of the outer ends of the legs upon bending of one leg into contact with the other leg to form a pointed end of the molding,
   c. removing a longitudinal section of the exterior thickness of the second portion from said one end thereof to a point beyond the apex of the wedge-shaped section,
   d. providing a mold having a cavity conforming to the shape of the desired pointed end of the molding,
   e. inserting said one end of the molding into the mold cavity and thereby bending the first leg into contact with the second leg,
   f. injecting liquid resinous material of said first color into the mold cavity in an amount sufficient to fill the cavity and reform the longitudinal section of the second portion removed in step (c) above, and
   g. allowing the injected resinous material to harden and bond to the molding to form the final desired pointed end of the molding.

2. The method as in claim 1, further characterized in that in step (b) the inner surface at the outer end of the second leg is formed as a longitudinally extending flat surface and the inner surface at the outer end of the first leg is formed as a flat surface at an angle directed at the second leg.

3. The method as in claim 1, further characterized in that in step (a) the wedge-shaped section defines a straight surface extending from the apex along the first portion and a curved surface extending from the apex into the material of the second portion.

4. The method as in claim 1, further characterized in that the mold of step (d) is provided with a void remaining at the pointed end of the cavity after insertion of the molding so that the liquid resin injected in step (f) will cover said one end of the molding.

* * * * *